(12) United States Patent
Gorthi et al.

(10) Patent No.: US 8,869,111 B2
(45) Date of Patent: Oct. 21, 2014

(54) METHOD AND SYSTEM FOR GENERATING TEST CASES FOR A SOFTWARE APPLICATION

(75) Inventors: Ravi Prakash Gorthi, Bangalore (IN); Anjaneyulu Pasala, Bangalore (IN)

(73) Assignee: Infosys Limited (IN)

( * ) Notice: Subject to any disclaimer, the term of this patent is extended or adjusted under 35 U.S.C. 154(b) by 655 days.

(21) Appl. No.: 12/891,031

(22) Filed: Sep. 27, 2010

(65) Prior Publication Data

US 2011/0016451 A1    Jan. 20, 2011

Related U.S. Application Data

(63) Continuation-in-part of application No. 12/321,133, filed on Jan. 15, 2009, now Pat. No. 8,161,459.

(51) Int. Cl.
*G06F 11/36* (2006.01)
*G06F 9/445* (2006.01)

(52) U.S. Cl.
CPC ........ *G06F 11/3684* (2013.01); *G06F 11/3692* (2013.01); *G06F 11/36* (2013.01); *G06F 9/445* (2013.01); *G06F 11/3668* (2013.01)
USPC ....................................................... 717/124

(58) Field of Classification Search
CPC ............ G06F 11/3696; G06F 11/3672; G06F 11/3668; G06F 11/3664; G06F 11/36; G06F 11/3692; G06F 11/3684; G06F 9/445
USPC ....................................................... 717/124
See application file for complete search history.

(56) References Cited

U.S. PATENT DOCUMENTS

| | | |
|---|---|---|
| 6,343,376 B1 | 1/2002 | Saxe et al. |
| 6,370,681 B1 | 4/2002 | Dellarocas et al. |
| 6,701,514 B1 | 3/2004 | Haswell et al. |
| 7,017,146 B2 | 3/2006 | Dellarocas et al. |
| 7,181,493 B2 * | 2/2007 | English et al. ................ 709/204 |
| 7,392,507 B2 | 6/2008 | Kolawa et al. |
| 7,788,636 B2 | 8/2010 | Nakamura et al. |
| 7,958,400 B2 | 6/2011 | Ur |
| 8,276,123 B1 | 9/2012 | Deng et al. |
| 2002/0095660 A1 | 7/2002 | O'Brien et al. |
| 2004/0030421 A1 | 2/2004 | Haley |
| 2004/0268308 A1 | 12/2004 | Srivastava et al. |
| 2005/0120276 A1 | 6/2005 | Kolawa et al. |
| 2005/0216555 A1 | 9/2005 | English et al. |

(Continued)

FOREIGN PATENT DOCUMENTS

WO    WO 2004107087    *    3/2005

OTHER PUBLICATIONS

Guidelines Test case from sce.uhcl.edu, pp. 1-18, published May 2002.*

*Primary Examiner* — Jonathan C Teixeira Moffat
*Assistant Examiner* — Lynda Dinh
(74) *Attorney, Agent, or Firm* — Lerner, David, Littenberg, Krumholz & Mentlik, LLP

(57) ABSTRACT

The present invention provides a method, system and computer program product for generating one or more test cases for testing a software application by identifying one or more units of functionalities of the software application, structuring use cases of the software application, using the identified units of functionalities, generating a first set of use case activity diagrams from the structured use cases, and generating test cases from the generated use case activity diagrams.

18 Claims, 3 Drawing Sheets

(56) References Cited

U.S. PATENT DOCUMENTS

| | | |
|---|---|---|
| 2005/0229043 A1 | 10/2005 | Nasuti et al. |
| 2005/0256665 A1* | 11/2005 | Hartmann et al. ............ 702/121 |
| 2006/0059027 A1* | 3/2006 | Berenbach et al. ............... 705/7 |
| 2006/0075303 A1 | 4/2006 | Ulrich et al. |
| 2006/0212540 A1* | 9/2006 | Chon et al. .................... 709/218 |
| 2006/0253839 A1* | 11/2006 | Avritzer et al. ............... 717/124 |
| 2007/0005786 A1 | 1/2007 | Kumar et al. |
| 2007/0087756 A1 | 4/2007 | Hoffberg |
| 2007/0220342 A1* | 9/2007 | Vieira et al. .................... 714/33 |
| 2008/0256393 A1 | 10/2008 | Ur |
| 2009/0094575 A1* | 4/2009 | Vieira et al. .................. 717/104 |
| 2010/0083240 A1 | 4/2010 | Siman |

* cited by examiner

METHOD AND SYSTEM FOR GENERATING TEST CASES FOR A SOFTWARE APPLICATION

This application is a continuation-in-part of U.S. application Ser. No. 12/321,133, filed on Jan. 15, 2009, the disclosure of which is incorporated herein by reference.

FIELD OF INVENTION

The present invention relates to generating test cases for testing a software application. More specifically it relates to structuring the use cases for generating test cases.

BACKGROUND OF THE INVENTION

Use case models are effective technique for functional requirement analysis and they drive the design and implementation of the system. Use cases also greatly improve the communication between customers and the developers.

Building a software application starts from gathering business/functional and technical requirements for the application. Use cases are then formed from such gathered business and technical requirements. Use case activity diagrams are developed from the use cases and finally the test cases are formed for software testing.

However, due to increasing complexity in software technology, a system is needed which can make the above process of analysze use case activity diagrams-generate test cases, a less time consuming activity.

BRIEF SUMMARY OF THE INVENTION

It is an object of the present invention to generate test cases for a software application.

It is another object of the present invention to structure use cases of the software application, for generating test cases.

To achieve the aforementioned objectives, the instant invention provides a method for generating one or more test cases for testing a software application, the method comprising identifying one or more units of functionalities of the software application; structuring use cases of the software application, using the identified units of functionalities; generating a first set of use case activity diagrams from the structured use cases; and generating test cases from the generated use case activity diagrams.

The present invention also provides a system for developing one or more test cases for testing a software application, the system comprising identifying module for identifying one or more units of functionalities of the software application; structuring module for structuring use cases of the software application, using the identified units of functionalities; a first generating module for generating a first set of use case activity diagrams from the structured use cases; and a second generating module for generating test cases from the generated use case activity diagrams.

The present invention also provides a computer program product for developing one or more test cases for testing a software application consisting of a plurality of instructions stored on tangible computer readable media which when run upon a computer processor carries out steps for managing resources, comprising instructions for identifying one or more units of functionalities of the software application; structuring use cases of the software application, using the identified units of functionalities; generating a first set of use case activity diagrams from the structured use cases; and generating test cases from the generated use case activity diagrams.

These and other features, aspects, and advantages of the present invention will become better understood with reference to the following description and claims.

BRIEF DESCRIPTION OF THE DRAWINGS

The various embodiments of the invention will hereinafter be described in conjunction with the appended drawings, provided to illustrate and not to limit the invention, wherein like designations denote like elements, and in which.

DETAILED DECSRIPTION

Figure 1:
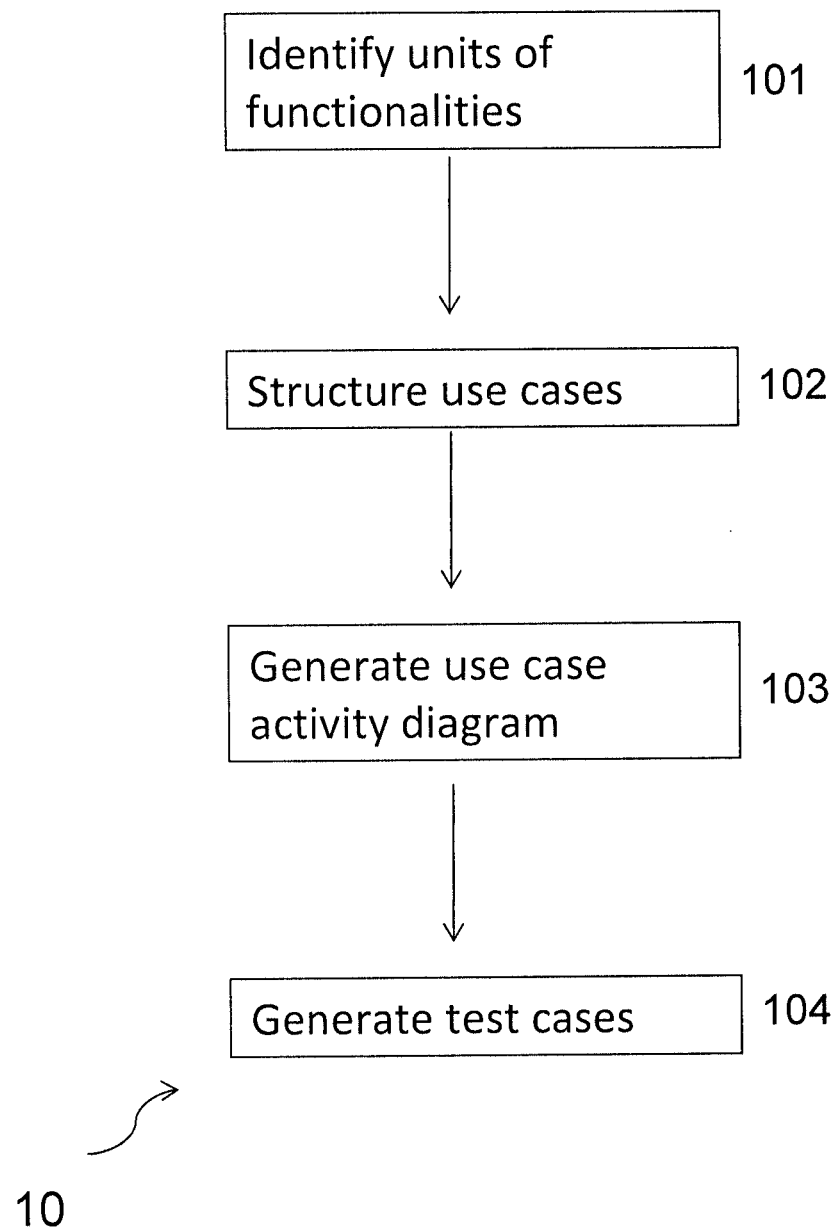
FIG. 1 illustrates a flowchart for generating test cases.

The instant invention uses the concept of structuring the use cases using unit of functionalities of the software application. The requirements of the software application are analyzed to identify the functionalities performed by the software application. Such functionalities are further sliced down to the basic unit in the form of a tuple <UI, SP, C, SO>, where UI: user input
SP: system process/set of instructions
C: conditions
SO: system output FIG. 1 is a flowchart describing the basic steps of the generation of test cases using units of functionalities.

The method (10) illustrates the steps of the generation of test cases. Initially the functionalities performed by the software application are identified (101) from the given software requirements. For eg, in a process relating to PIN validation for ATM system, one of the units of functionalities would be 'entering the PIN', which can be represented as a tuple as:

UI: swipe card
SP: card validation
C: if card is valid
SO: Display message 'enter PIN'

Similarly such units of functionalities of the software application are identified. In an embodiment, this analysis and identification is done manually. In step 102, the use cases of the software application are structured or decomposed into an ordered sequence of units of functionalities using 'behavioral slicing' technique. Use case activity diagrams (UCADs) are generated from such structured use cases (103). These UCADs are structured automatically and represent functional requirements visually. Finally in step 105, the test cases are generated by traversing the UCADs. In an embodiment, the UCADs are traversed using a depth first strategy. Each path of the UCAD corresponds to a test scenario.

Figure 2:
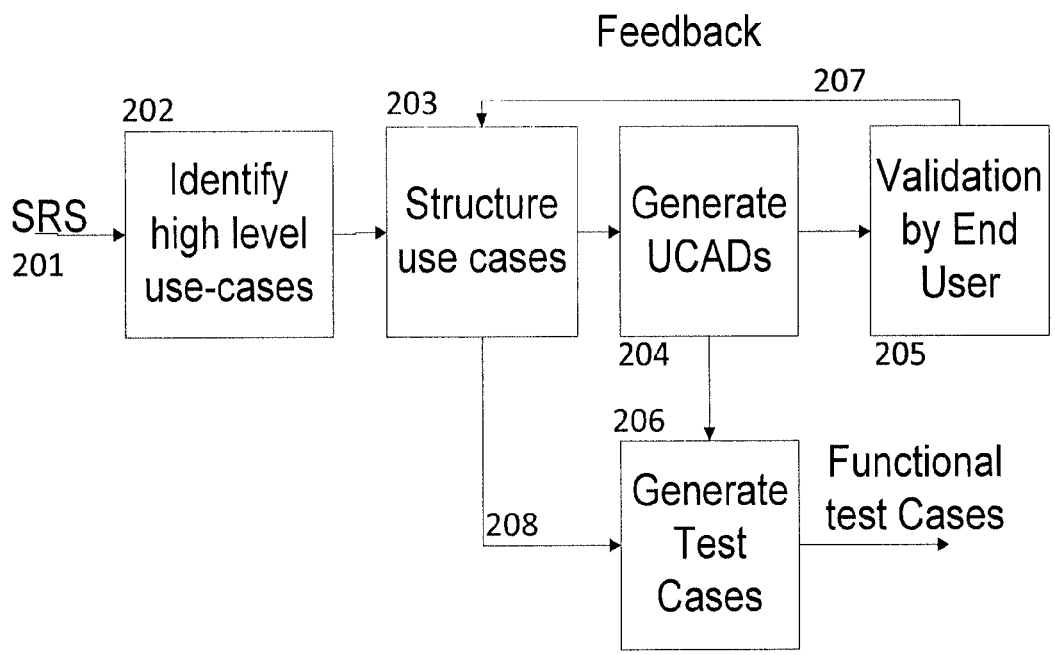
FIG. 2 is a flowchart for a preferred embodiment of a method for developing test cases.

FIG. 2 describes a preferred embodiment of the present invention for generating the test cases (20). In one embodiment, the input provided is in the form of SRS, which contains the requirements of the software application (201). SRS is in the unstructured/non-decomposed format, with no functionalities identified. In step 202, high level use cases are formed from the SRS.

In a preferred embodiment, the use cases are structured using behavioral slicing (203). The units of functionalities are identified from the SRS and the use cases are decomposed using the units of functionalities. UCADs are generated from the decomposed use cases in step 204. The UCADs are automatically structured and represent the functional requirements of the application.

In an embodiment of the present invention, the end users or clients will validate the UCADs (205). The users or the clients will review the UCADs and verify the requirements including exception flows. The feedback (207) given by the users/clients is used to update the use cases in case there is some point not covered in the UCADs or there is some mismatch. In an embodiment, corrected UCADs are created from the updated use cases.

After the UCADs are completely verified, in a preferred embodiment, the UCADs are traversed and the paths are enumerated. In an embodiment, the UCADs are traversed using a depth first strategy. Each path corresponds to a test scenario. Each path is sliced into units of behavior and a test case step is generated (206). Thus functional test cases are generated.

In an embodiment, the test cases are also generated from the structured use cases (208), rather than from UCADs.

In another embodiment, the instant invention includes generating regression test cases when there is a change in software requirements. For each change in the software requirements, new use cases are generated. UCADs are generated for the new use cases. Both the old and the new UCADs are analysed. The behavior corresponding to the affected paths need to be revalidated. There can be two types of paths: the paths that have been affected due to changes in the specification; and the paths that have been newly added due to addition of some features in the specification. In the first case, the test cases that traverse the affected paths are already existing and recommended for regression testing to validate the changed part of the specifications. In case of newly added paths, a new set of test cases are generated which facilitate the newly added behavior of the software. Both sets of test cases together constitute the regression test suite.

In another embodiment of the instant invention, the use cases can be reused. A use case can include another use case using by linking the use case. One use case can be referred to by another use case. The re-usable part of the use-case can be stored in a separate file. In the main use-case it can be called using reference id and file name. User can provide either full path or partial path of the file. In an embodiment, the use cases are allotted an identifier, or a 'reference id'. Example: Reference id=10 <path/file-name.txt>

Where file-name.txt is a use case behavior that needs to be included in this use case behavior and path is file location.

The above can be described by an example here:

Output id="8": Display a welcome message and display the main menu
  a. Input id="9": User selects an option from the menu
  b. Decision id="10": User choice
    i. If: user choice=withDraw
    ii. Goto: 11
    iii. Else: user choice=changePIN
    iv. Goto: 12
  c. Output id="11": display the withdraw cash menu
  d. Reference id=1 <cashWithdraw.txt>
  e. Output id="12": Display the Change PIN menu and prompt for old PIN
  f. Reference id=2 <changePIN.txt
  g. Goto: stop In the above use case example, two other use cases have been referred to,
Reference id=1 <cashWithdraw.txt> and Reference id=2 <changePIN.txt>

Figure 3:
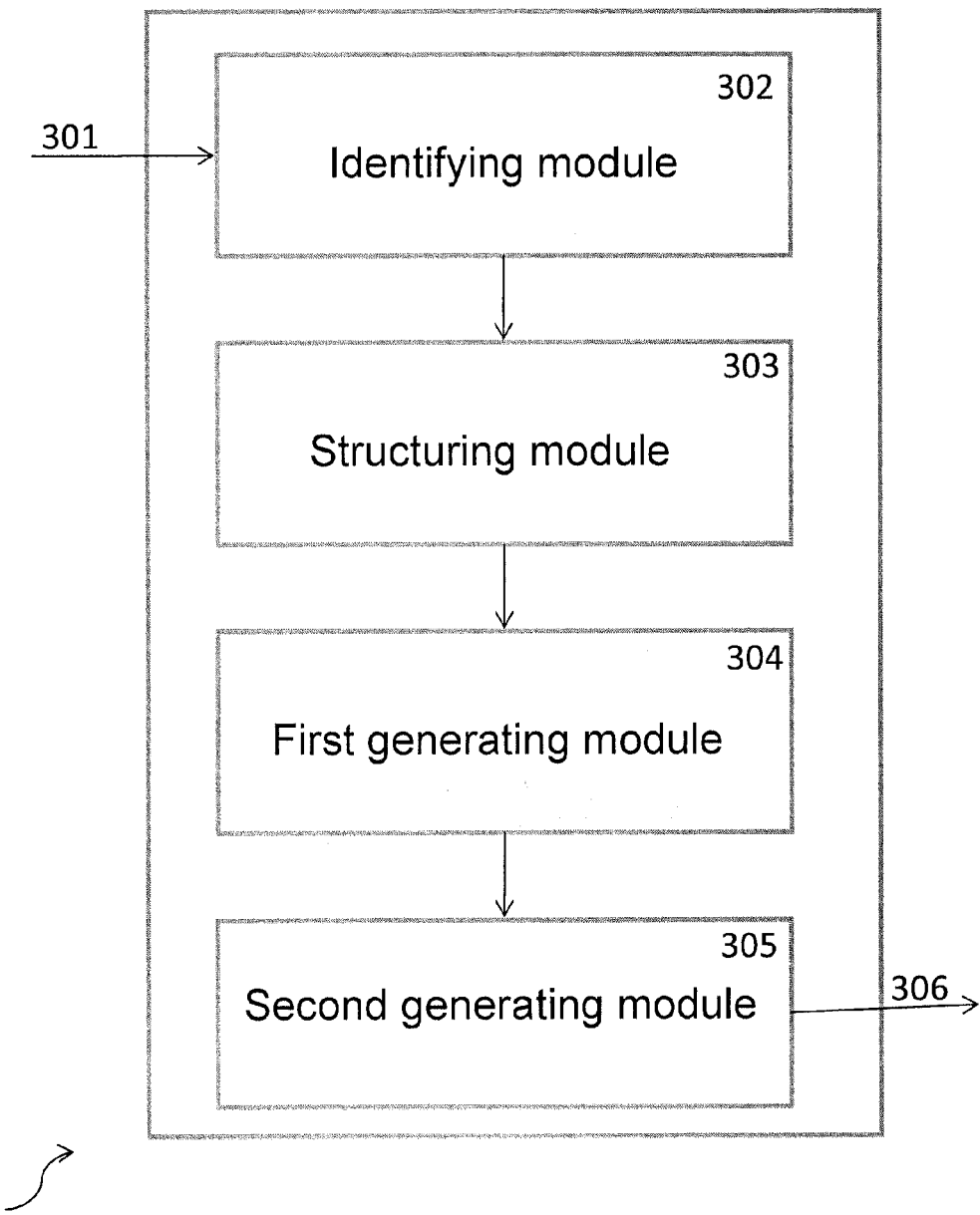
FIG. 3 shows a system for generating test cases, in accordance with an embodiment of the present invention.

FIG. 3 relates to a system (30) for generating test cases. (301) is an input provided to the system. In one embodiment, it is the requirements of the software application in an unstructured format. In one embodiment, the input is the SRS document. The input is provided to the identifying module (302) which identifies the units of functionalities of the software application from the SRS. In one embodiment, this is done manually. The units of functionalities comprise an input, a set of conditions, a set of tasks for processing the input based on the set of conditions and an output.

The structuring module (303) structures the use cases of the software application, using the units of functionalities identified by the identifying module (302). A first generating module (304) uses the structured use cases to generate a first set of use case activity diagrams from the structured use cases; and a second generating module (305) generates test cases (306) from the generated use case activity diagrams.

In an embodiment, the second generating module has a developing module for developing test cases from the structured use cases for regression testing of the software application.

In a preferred embodiment, the system (30) includes a validating module for validating the generated use case activity diagrams with the requirements of the software application and updating module for updating the structured use cases based on the validation.

In another embodiment, the system includes a developing module for developing test cases for regression testing of the software application.

In yet another embodiment, the system has a linking module for linking the use cases. The linking module includes an allocating module for allocating an identifier to each use case, and a referring module for referring to a first use case from one or more other use cases, using the identifier of the first use case.

The developing module has an updating module for updating the structured use cases based on a change in the requirements of the software application, a generating module for generating a second set of use case activity diagrams for the updated structured use cases, and a creating module for creating test cases for the regression testing from the first and second set of use case activity diagrams.

The system for developing one or more test cases for testing a software application, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for developing one or more test cases for testing a software application. The computer program product includes a computer usable medium having a set of program instructions comprising a program code for generating test cases for testing a software application. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

The invention claimed is:

1. A method for developing one or more test cases for testing a software application, the method comprising:
   identifying one or more units of functionalities of the software application by slicing the functionalities of the software application to an indivisible level, further wherein each unit of the one or more units of the functionalities of the software application comprises an ordered sequence of a user input, a set of instructions to process the input, a set of conditions and a system output;
   structuring use cases of the software application into the ordered sequence of the user input, the set of instructions to process the input, the set of conditions and the system output;
   generating a first set of use case activity diagrams from the structured use cases;
   generating test cases from the generated first set of use case activity diagrams, wherein the test cases are generated by traversing the use case activity diagrams using a depth first strategy, further wherein each traversed path of the use case activity diagrams corresponds to a test case; and
   linking a plurality of the use case activity diagrams for one or more software applications, wherein the linking facilitates reusability of the plurality of the use case activity diagrams.

2. The method of claim 1, wherein generating test cases further comprises generating test cases from the structured use cases.

3. The method of claim 1, wherein the method further comprises:
   validating the generated use case activity diagrams with requirements of the software application; and
   updating the structured use cases based on the validation.

4. The method of claim 1, wherein the method further comprises developing test cases for regression testing of the software application.

5. The method of claim 4, wherein developing test cases for regression testing of the software application comprises:
   updating the structured use cases based on a change in requirements of the software application;
   generating a second set of use case activity diagrams for the updated structured use cases; and
   creating test cases for the regression testing from the generated first set of use case activity diagrams and the generated second set of use case activity diagrams.

6. The method of claim 1, wherein the linking comprising:
   allocating an identifier to each use case; and
   referring to a first use case from one or more other use cases, using the identifier of the first use case.

7. A computer system for developing one or more test cases for testing a software application, the computer system comprising a microprocessor and a memory, the computer system further comprising:
   identifying module, using the microprocessor, for identifying one or more units of functionalities of the software application by slicing the functionalities of the software application to an indivisible level, further wherein each unit of the one or more units of the functionalities of the software application comprises an ordered sequence of a user input, a set of instructions to process the input, a set of conditions and a system output;
   structuring module, using the microprocessor, for structuring use cases of the software application into the ordered sequence of the user input, the set of instructions to process the input, the set of conditions and the system output;
   a first generating module, using the microprocessor, for generating a first set of use case activity diagrams from the structured use cases;
   a second generating module, using the microprocessor, for generating test cases from the generated first set of use case activity diagrams, wherein the test cases are generated by traversing the use case activity diagrams using a depth first strategy, further wherein each traversed path of the use case activity diagrams corresponds to a test case; and
   a linking module, using the microprocessor, for linking a plurality of the use case activity diagrams for one or more software applications, wherein the linking facilitates reusability of the plurality of the use case activity diagrams.

8. The computer system of claim 7, wherein the second generating module comprises developing module for developing test cases, using the microprocessor, from the structured use cases for regression testing of the software application.

9. The computer system of claim 7 further comprising:
   validating module, using the microprocessor, for validating the generated use case activity diagrams with requirements of the software application; and
   updating module, using the microprocessor, for updating the structured use cases based on the validation.

10. The computer system of claim 7, further comprising a developing module, using the microprocessor, for developing test cases for regression testing of the software application.

11. The computer system of claim 10, wherein the developing module comprises:
- updating module, using the microprocessor, for updating the structured use cases based on a change in requirements of the software application;
- generating module, using the microprocessor, for generating a second set of use case activity diagrams for the updated structured use cases; and
- creating module, using the microprocessor, for creating test cases for the regression testing from the generated first set of use case activity diagrams and the generated second set of use case activity diagrams.

12. The computer system of claim 7, wherein the linking module comprises:
- allocating module, using the microprocessor, for allocating an identifier to each use case; and
- referring module, using the microprocessor, for referring to a first use case from one or more other use cases, using the identifier of the first use case.

13. A computer program product for developing one or more test cases for testing a software application consisting of a plurality of instructions stored on a non-transitory tangible computer readable media which when run upon a computer processor carries out steps for managing resources, comprising instructions for:
- identifying one or more units of functionalities of the software application by slicing the functionalities of the software application to an indivisible level, further wherein each unit of the one or more units of the functionalities of the software application comprises an ordered sequence of a user input, a set of instructions to process the input, a set of conditions and a system output;
- structuring use cases of the software application into the ordered sequence of the user input, the set of instructions to process the input, the set of conditions and the system output;
- generating a first set of use case activity diagrams from the structured use cases;
- generating test cases from the generated first set of use case activity diagrams, wherein the test cases are generated by traversing the use case activity diagrams using a depth first strategy, further wherein each traversed path of the use case activity diagrams corresponds to a test case; and
- linking a plurality of the use case activity diagrams for one or more software applications, wherein the linking facilitates reusability of the plurality of the use case activity diagrams.

14. The computer program product of claim 13, wherein the instructions for generating test cases, generate test cases from the structured use cases.

15. The computer program product of claim 13 further comprising instructions for:
- validating the generated use case activity diagrams with requirements of the software application; and
- updating the structured use cases based on the validation.

16. The computer program product of claim 13 further comprising instructions for developing test cases for regression testing of the software application.

17. The computer program product of claim, 16 wherein the instructions for developing test cases for regression testing of the software application comprises instructions for:
- updating the structured use cases based on a change in requirements of the software application;
- generating a second set of use case activity diagrams for the updated structured use cases; and
- creating test cases for the regression testing from the generated first set of use case activity diagrams and the generated second set of use case activity diagrams.

18. The computer program product of claim 13 further comprising instructions for linking the use cases, the instructions further comprising instructions for:
- allocating an identifier to each use case; and
- referring to a first use case from one or more other use cases, using the identifier of the first use case.

\* \* \* \* \*